(No Model.)
E. W. MERRILL.
MANUFACTURE OF TURN-BUCKLES.
No. 282,102. Patented July 31, 1883.
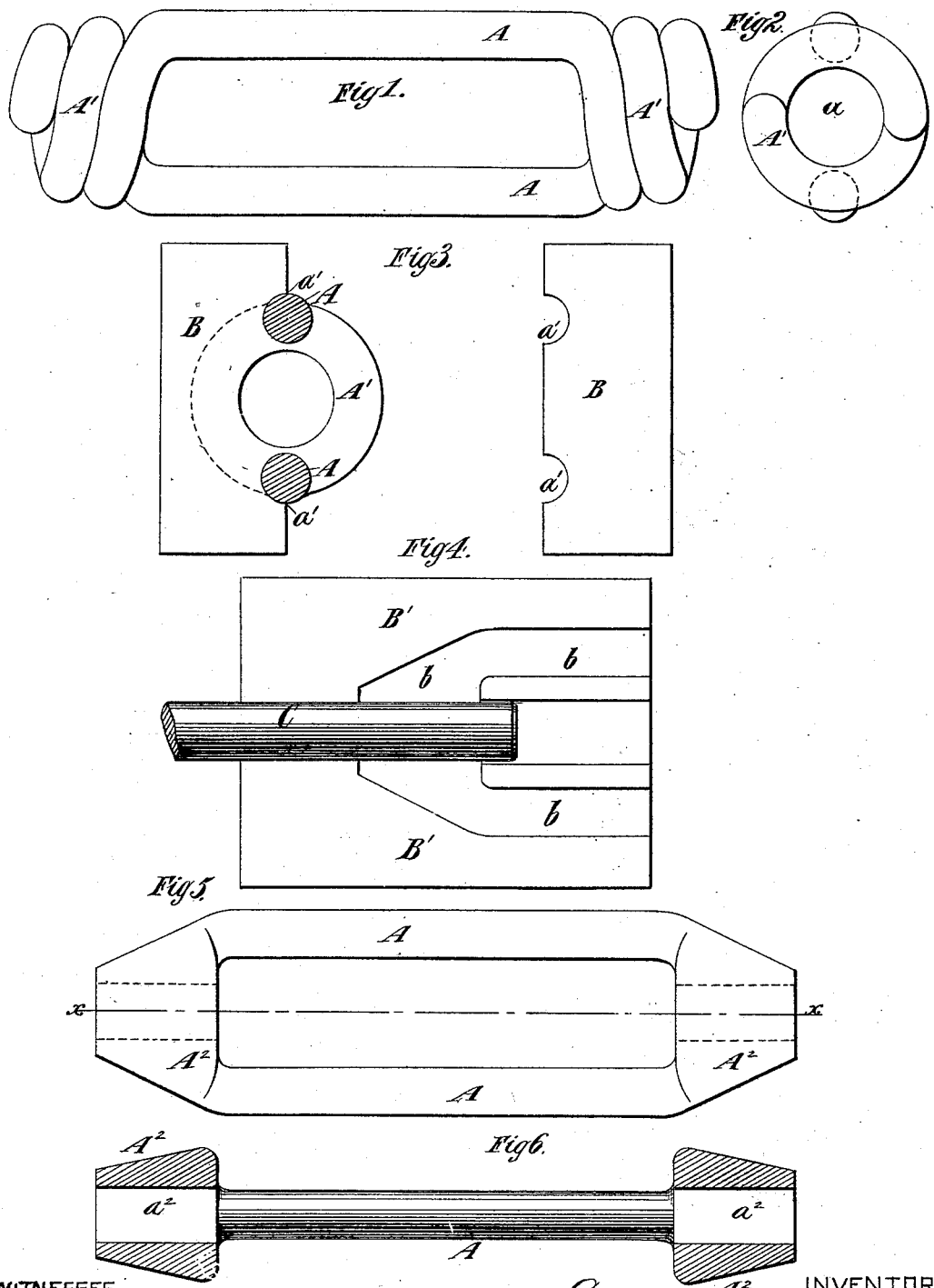

UNITED STATES PATENT OFFICE.

EDWARD W. MERRILL, OF BROOKLYN, NEW YORK.

MANUFACTURE OF TURN-BUCKLES.

SPECIFICATION forming part of Letters Patent No. 282,102, dated July 31, 1883.

Application filed September 16, 1881. (No model.)

*To all whom it may concern:*

Be it known that I, EDWARD W. MERRILL, of Brooklyn, in the county of Kings and State of New York, have invented a certain new and useful Improvement in the Art of Making Turn-Buckles and other Socketed Articles, of which the following is a specification.

My improvement is particularly applicable in the manufacture of turn-buckles, but also in the manufacture of socketed links or other articles comprising a socket or sockets and parallel rods or bars extending therefrom.

The improvement consists in coiling two bars or rods together at the point where it is desired to form a socket, and in welding and forging the coil to form it into a tubular shape to form a socket.

The forging is preferably accomplished by placing the coiled portions of the rods or bars in a divided die and subjecting the die to the action of a drop-press in a manner similar to that in which the drop-forgings are made.

In the accompanying drawings, Figure 1 represents a side view of two rods coiled at a proper distance apart to form the sockets of a turn-buckle. Fig. 2 represents an end view thereof. Fig. 3 represents an end view of a divided die, whereby the two parallel portions of the turn-buckle are held while the socket is partially formed, and a transverse section of the turn-buckle in one portion of said die, the other portion being slightly removed therefrom. Fig. 4 represents a plan view of one portion of the die by which the socket is formed. Fig. 5 represents a side view of the completed turn-buckle, and Fig. 6 represents a section thereof on the dotted line *x x*, Fig. 5.

Similar letters of reference designate corresponding parts in all the figures.

A A designates two round rods or bars, which are of proper size to form the two sides or parallel portions of the turn-buckle. These rods or bars are coiled or twisted together at each end, so as to form two double coils or spirals, A', which have a central opening or hole, *a*, which is larger than the diameter of the hole in the finished socket. These coils A' may be forged into sockets by hand; but I prefer to do it by drop-forging, and in Figs. 3 and 4 I have represented dies which are employed for this purpose.

B B, Fig. 3, represent the two parts of a divided die, which have cavities *a'*, which are adapted to receive the two rods A close to the coil A'. A welding heat is first taken on the coil A', and the die B B is fitted upon the rods close to the coil, after which a blow is delivered upon the coil by a drop-press in the direction of the length of the turn-buckle, to weld the convolutions of the coil together.

The finishing-die is composed of two parts, B', one of which is shown in Fig. 4, in the adjacent faces of which is formed a cavity, *b*, of proper shape to give form to the socket, and also to receive the portions of the two rods A which are adjacent to the socket. In the adjacent faces of the two portions B' B' of the die is also formed a hole, into which a round mandrel, C, may be inserted, as seen in Fig. 4, to form the hole of proper size in the finished socket.

After the coils A' have been formed in the rods A, and partially welded, as above described, the coils are heated and placed one at a time in the cavity *b* in the adjacent faces of the two portions B' of the die. The mandrel C is inserted through the hole or opening *a* in the coil, and the die is subjected to the action of a drop-press, which forces the two portions of the die together and causes the coil A' to completely fit the cavity *b* in the portions of the die. The two portions of the die are then separated, the mandrel C knocked out, and the other coil A' of the turn-buckle is subjected to the same operation.

By the action of the dies the several convolutions of the coil A' are welded together into one integral mass of tubular shape, to form a socket, in which is a smooth hole of proper size to receive a bolt or rod used with the turn-buckle.

In Figs. 5 and 6, which represent two views of the completed turn-buckle, A² designates the completed sockets, and *a²* the holes through the same.

Although my invention is particularly applicable to turn-buckles, it is also applicable in forging any articles comprising two parallel rods or bars connected by an integral socket; and by my invention I cheapen the manufacture of turn-buckles and analogous articles, and also enable a stronger and better article to be produced.

It is obvious that rods or bar-iron of square or other form might be used instead of round rods or bars, as represented in the drawings.

What I claim as my invention, and desire to secure by Letters Patent, is—

The improvement in the art of manufacturing turn-buckles and analogous articles herein described, which consists in coiling or twisting together each of the contiguous ends of two rods or bars, and then welding and forging the coiled or twisted portions into tubular shape to form sockets.

EDW. W. MERRILL.

Witnesses:
FREDK. HAYNES,
ED. MORAN.